US 8,027,276 B2

(12) United States Patent
Nierhaus

(10) Patent No.: US 8,027,276 B2
(45) Date of Patent: Sep. 27, 2011

(54) MIXED MODE CONFERENCING

(75) Inventor: Florian Patrick Nierhaus, Munich (DE)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1179 days.

(21) Appl. No.: 10/823,901

(22) Filed: Apr. 14, 2004

(65) Prior Publication Data

US 2005/0232166 A1    Oct. 20, 2005

(51) Int. Cl.
*H04L 12/16* (2006.01)
*H04M 3/42* (2006.01)

(52) U.S. Cl. .................................. 370/260; 379/202.01

(58) Field of Classification Search .......... 370/260–269, 370/401; 379/202.02–206.01, 52, 88.13, 379/202.01, 88.14, 201.01, 88.17; 704/204, 704/235, 271, 277, 260, 3, 8; 709/204, 203, 709/233; 455/466
See application file for complete search history.

(56) References Cited

U.S. PATENT DOCUMENTS

| | | | |
|---|---|---|---|
| 4,589,107 A | 5/1986 | Middelton et al. | |
| 6,173,250 B1* | 1/2001 | Jong | 704/3 |
| 6,574,469 B1 | 6/2003 | Xiang et al. | |
| 6,618,704 B2* | 9/2003 | Kanevsky et al. | 704/271 |
| 6,816,468 B1* | 11/2004 | Cruickshank | 370/260 |
| 6,816,578 B1* | 11/2004 | Kredo et al. | 379/88.17 |
| 6,820,055 B2* | 11/2004 | Saindon et al. | 704/235 |
| 6,950,501 B1* | 9/2005 | Chaturvedi et al. | 379/52 |
| 7,007,098 B1* | 2/2006 | Smyth et al. | 709/233 |
| 7,124,163 B2* | 10/2006 | Geofroy et al. | 709/203 |
| 7,200,208 B2* | 4/2007 | Smith et al. | 379/52 |
| 7,225,224 B2* | 5/2007 | Nakamura | 709/204 |
| 7,236,580 B1* | 6/2007 | Sarkar et al. | 379/202.01 |
| 7,277,855 B1* | 10/2007 | Acker et al. | 704/260 |
| 7,412,040 B2* | 8/2008 | Koch | 379/88.14 |
| 2002/0037074 A1 | 3/2002 | Dowens et al. | |
| 2003/0054844 A1* | 3/2003 | Anvekar et al. | 455/466 |
| 2003/0061026 A1* | 3/2003 | Umpleby et al. | 704/8 |
| 2003/0185359 A1 | 10/2003 | Moore et al. | |
| 2004/0003041 A1 | 1/2004 | Moore et al. | |
| 2004/0015553 A1 | 1/2004 | Griffin et al. | |
| 2004/0086100 A1* | 5/2004 | Moore et al. | 379/201.01 |
| 2004/0218744 A1* | 11/2004 | Nguyen et al. | 379/202.01 |
| 2004/0225501 A1* | 11/2004 | Cutaia | 704/260 |
| 2004/0267527 A1* | 12/2004 | Creamer et al. | 704/235 |
| 2004/0267531 A1* | 12/2004 | Whynot et al. | 704/260 |
| 2005/0021344 A1* | 1/2005 | Davis et al. | 704/277 |
| 2006/0146994 A1* | 7/2006 | Koch | 379/88.13 |

FOREIGN PATENT DOCUMENTS

WO    WO 03/071774    8/2003

OTHER PUBLICATIONS

Gallatin River Communications web page, copyright 1999-2002.

* cited by examiner

*Primary Examiner* — Rasha Al Aubaidi
*Assistant Examiner* — Sonia Gay

(57) ABSTRACT

A conferencing system integrates multiple conference types into a mixed mode conference. The mixed mode conference may integrate text messaging (such as instant messaging) conferences, voice conferences, and other types of conferences. The conferencing system may enhance communication possibilities by allowing individuals that cannot participate in one type of conference to nevertheless communicate with others engaged in that type of conference.

28 Claims, 5 Drawing Sheets

MIXED MODE CONFERENCING

BACKGROUND

1. Technical Field

This invention relates to data and voice conferencing. In particular, this invention relates to a conferencing system that integrates multiple conference types into a mixed mode conference.

2. Background Information

Rapid advances in technology have given rise to new communication tools for business and personal use. Voice conferencing systems now seamlessly connect multiple participants, though they may be located virtually anywhere. As another example, instant-messaging provides text message exchange between multiple individuals that is often much more responsive and interactive than standard email.

Despite the development of these communication tools, it is not always possible for everyone that desires to communicate to actually do so. As one example, individuals that are hearing impaired may find it difficult to participate in voice conferences. As another example, individuals already engaged in other tasks may find it difficult to participate in an instant-messaging or a voice conference, depending on the primary task.

There are other reasons, such as hardware limitations, that may also limit the ability of an individual to participate in a conference. For example, an individual may be unable to participate in a voice conference because that individual does not have a microphone or speakers required for a voice conference. Effective communication, however, is crucial to successfully conducting business activities, to accomplish personal tasks that arise on a daily basis, and for other reasons.

A need has long existed to address the problems noted above and others previously experienced.

SUMMARY

This invention provides mixed mode conferences and may enhance communication possibilities for conference participants. Conference participants may play a part in the mixed mode conference even though they employ a conference type that differs from other conference participants. For example, one conference participant may communicate with instant messaging conferencing, while a second conference participant may communicate with voice conferencing. Individuals that cannot engage in a particular conference type may thereby participate in the mixed mode conference using the conference type that is available to them.

In one implementation, a conferencing system includes a memory and a processor. The conferencing system receives data from endpoints employing different conference types. The memory stores the endpoint data and a conversion program. The conversion program converts endpoint data from one conference type to data for a different conference type. The processor executes the conversion program when endpoints employing disparate conference types send information to one another.

In operation, the conferencing system receives first conference-endpoint data for a first conference type from a first endpoint and also receives second conference-endpoint data for a second conference type from a second endpoint. When the second conference type is different than the first conference type, the conferencing system converts the first conference-endpoint data into a form compatible with the second conference type. The conferencing system may then transmit the converted first conference-endpoint data to the second endpoint.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects herein.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the distributed voice conferencing may be stored on or read from other machine-readable media, for example, secondary storage devices such as hard disks, floppy disks, and CD-ROMs; a signal received from a network; or other forms of ROM or RAM either currently known or later developed.

Furthermore, although specific components of the conferencing systems will be described, methods, systems, and articles of manufacture consistent with the conferencing systems may include additional or different components. For example, a processor may be implemented as a microprocessor, microcontroller, application specific integrated circuit (ASIC), discrete logic, or a combination of other types of circuits acting as explained above. Similarly, memories may be DRAM, SRAM, Flash or any other type of memory. With regard to databases, tables, and other data structures, they may be separately stored and managed, incorporated into a single memory or database, or logically and physically organized in many different ways. One or more programs may be parts of a single program, may be separate programs, or may be distributed across several memories or processors.

Figure 1:
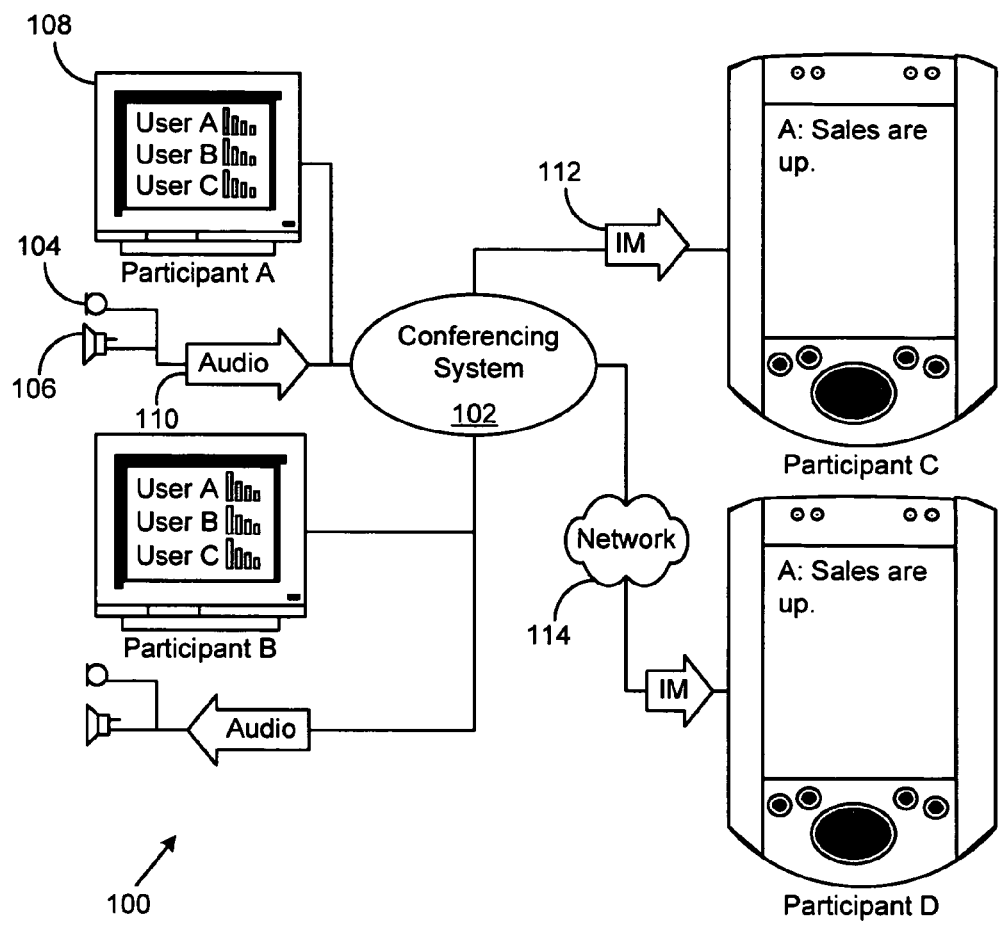
FIG. 1 illustrates one implementation of a mixed mode conference taking place between several participants.

FIG. 1 illustrates a mixed mode conference 100 taking place between four participants A, B, C, and D. There may be any number of participants, however. Each participant communicates through the conferencing system 102. The conferencing system 102 manages and coordinates the mixed mode conference 100. The conferencing system 102 may be implemented as a stand alone processing system, for example, or may be integrated with other processing systems that perform other functions. Alternatively, the conferencing system 102 may be distributed between multiple logically or physically separate processing systems.

In the example shown in FIG. 1, participants A and B are voice conference participants, while participants C and D are instant messaging participants. Participants A and B expect to have a conference experience consistent with a voice conference type, while participants C and D expect to have a conference experience consistent with a text messaging conference type. The participants are not limited to voice conferencing or text messaging conference types, however. Rather, a participant may employ any desired conference type, with the conferencing system 102 acting as an intermediary as explained below.

Each participant transmits and receives data compatible with their conference type. For example, participants A and B transmit and receive audio data 110, while the participants C and D transmit and receive text data 112. Nevertheless, in alternate implementations, a participant may receive multiple types of conference data from the conferencing system 102. For example, a voice conference participant may not only receive audio data, but also corresponding text messages that may be stored for later review.

The audio data 110 and text data 112 may be encoded according to any desired protocol. In one implementation, the conferencing system 102 transmits and receives conference traffic using a packet based protocol. For example, the conferencing system 102 may employ the Real Time Protocol (RTP) over UDP to provide a responsive conference experience for the participants. In addition, the signaling between the conferencing system 102 and the endpoints may proceed according to the H.323 packet-based multimedia communications system standard published by the International Telecommunications Union (ITU). Alternatively or additionally, the conferencing system 102 may employ protocols selected according to any desired network implementation specification. For example, the conferencing system 102 and endpoints may employ the Session Initiation Protocol (SIP) developed for Internet conferencing, telephony, presence, events notification and instant messaging, the Jabber protocol, or SIP for Instant Messaging and Presence Leveraging Extensions (SIMPLE).

In keeping with their conference type, participants A and B interact with hardware that supports voice conferencing. For example, the hardware may include a microphone 104, a speaker 106, and a processing system 108. The processing system 108 may include a sound card, network connection, and voice coding/decoding software.

The hardware may vary from participant to participant, however, and as additional examples may take the form of a home or office personal computer, telephone set, or another input/output device that digitizes audio data received through the microphone, encodes the audio data, and transmits the audio data to the conferencing system 102. Similarly, the hardware may receive audio conference traffic from the conferencing system 102, decode the audio data in the conference traffic, and reproduce the audio data using the sound card and speakers attached to the personal computer.

Unlike participants A and B, participants C and D are text messaging participants. For that reason, participants C and D interact with hardware that supports text messaging. For example, the hardware may include a personal data assistant, pager, or cell phone through which the participant enters a text message. Alternatively, the hardware may be a personal computer with or without a microphone, speakers and sound card, but that accepts and transmits text messages to the conferencing system 102.

The participants A, B, C, and D are examples of endpoints in the voice conference. An endpoint is not limited a human speaker sitting at a desk or in a conference room. Rather, the endpoint may represent any connection to the mixed mode conference 100, including those that are automatic or mechanical in nature. For example, an endpoint may be a computer system that records each message in the mixed mode conference for later reference.

Each endpoint communicates with the conferencing system 102 through a network, such as the network 114. The network 114 provides a transport mechanism or interconnection of multiple transport mechanisms for mixed mode conference traffic to and from the endpoint. As one example, the external network 114 may represent an IP packet switched network connected to the endpoint through a dial-up, DSL, T1, or other network connection.

Each endpoint may be assigned a network address that serves to identify the endpoint. The network address may include an IP address, for example, or and IP address and a port number. However, alternative addressing techniques may additionally or alternatively be employed to identify and direct mixed mode conference traffic to and from the endpoints.

The conferencing system 102 supports a mixed mode conference. For example, the mixed mode conference integrates voice conferencing and text message conferencing. As shown in FIG. 1, participant A transmits the audio data 110 to the conferencing system 102. For example, the audio data 110 may be coded audio data, packetized and transmitted to the conferencing system 102. Other transmission formats also may be employed, however. In response, the conferencing system 102 may decode the audio data and recode the audio data using a coder negotiated for participant B when participant B joined the mixed mode conference 100. The conferencing system transmits the optionally recoded audio data to participant B, also a voice conference participant.

Note, however, that participants C and D engage in the mixed mode conference 100 as text conference (e.g., instant messaging) type participants. Accordingly, the conferencing system 102 converts the audio data 110 to a form suitable for a text messaging participant. For example, the conferencing system 102 may convert the audio data 110 to text, and transmit the text as an instant message 112 to each participant C and D.

As shown in FIG. 1, participant A has spoken "Sales are up." Voice conferencing participant B receives the coded audio data for that message, decodes the data, and plays the message back in audible form. On the other hand, participants C and D see that message in a converted form, namely as text.

The conferencing system 102 may also send the original coded voice data to the participants C and D. Similarly, the conferencing system 102 may send the text data to participant B or participant A for later reference. The participants may therefore store and later manipulate the conference data in different forms.

As an aid in identifying the participants, the conferencing system 102 may include an endpoint identifier in the data transmitted to each endpoint. For example, the conferencing system 102 may transmit a label such as "A:" to identify a contribution to the conference from participant A. The endpoint identifier may take other forms, however, including special symbols, data fields, speaker indicators, identifiers, or characteristics, or other indicia assigned to or characterizing a participant.

The conferencing system 102 may convert endpoint data bi-directionally. In other words, the conferencing system 102 not only converts voice conference data to text messaging data, for example, but also converts text messaging data to voice conference data. Accordingly, the conferencing system 102 may convert text messages sent by the participants C and D into encoded voice data for the participants A and B.

Figure 2:
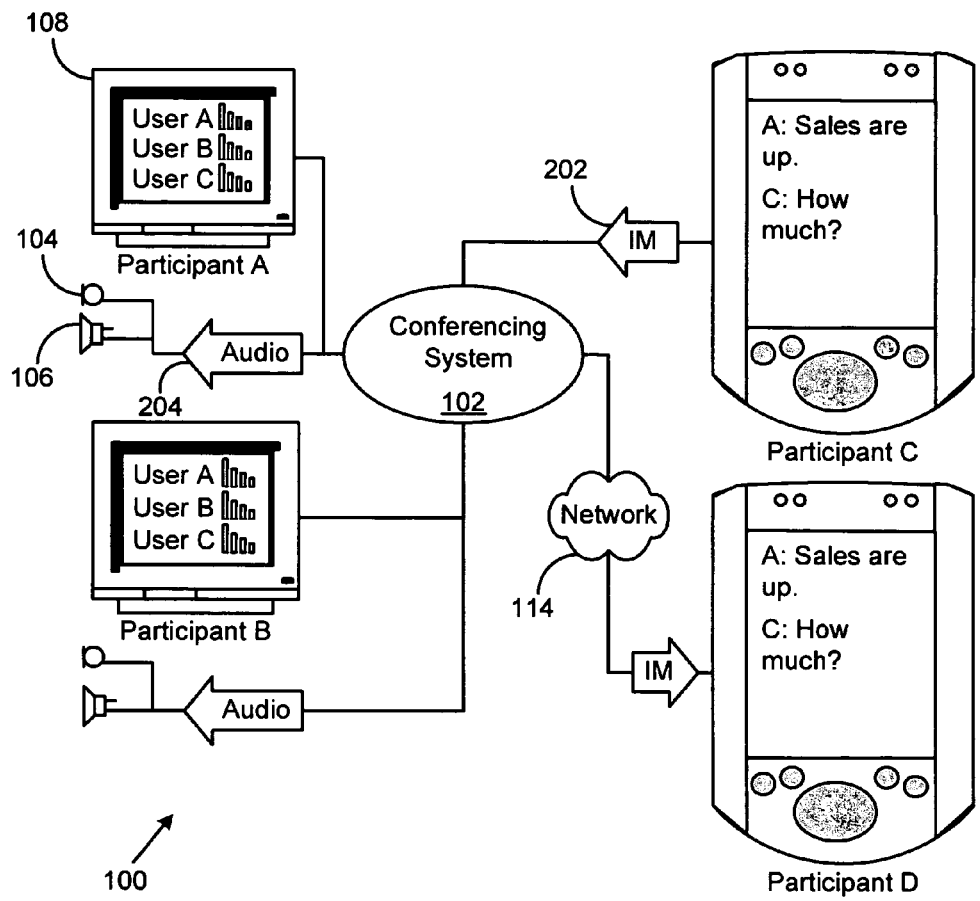
FIG. 2 illustrates one implementations of a mixed mode conference taking place between several participants.

As shown in FIG. 2, the participants C and D have received the converted voice conference data from participant A: "Sales are up." as an instant message. Participant C then replies with a text message 202, "How much?", to the mixed mode conference 100. The conferencing system 102 receives the text message from participant C and relays the instant message to the other text messaging participant D.

Participants A and B have joined the mixed mode conference 100 as voice conference participants. Consequently, the conferencing system 102 converts the text data 202 a form suitable for a voice conferencing participant. For example, the conferencing system 102 may convert the text data 202 to coded voice data, and transmit the coded voice data as audio data 204 to each participant A and B. In other words, the conferencing system 102 may apply the coder negotiated for each participant A and B when participants A and B joined the mixed mode conference 100.

FIG. 2 illustrates that participant C has sent the text message "How much?" The text messaging participant D receives the text message and displays the message with the hardware employed by participant D. On the other hand, the conferencing system 102 converts the text message 202 to the coded audio data and sends the coded audio data to the participants A and B. In turn, the participants A and B receive the coded audio data, decode the data, and play the message back in audible form.

Note that the conferencing system 102 may also send the original text message to the participants A and B. Similarly, the conferencing system 102 may send the coded audio data to participants C and D.

Figure 3:
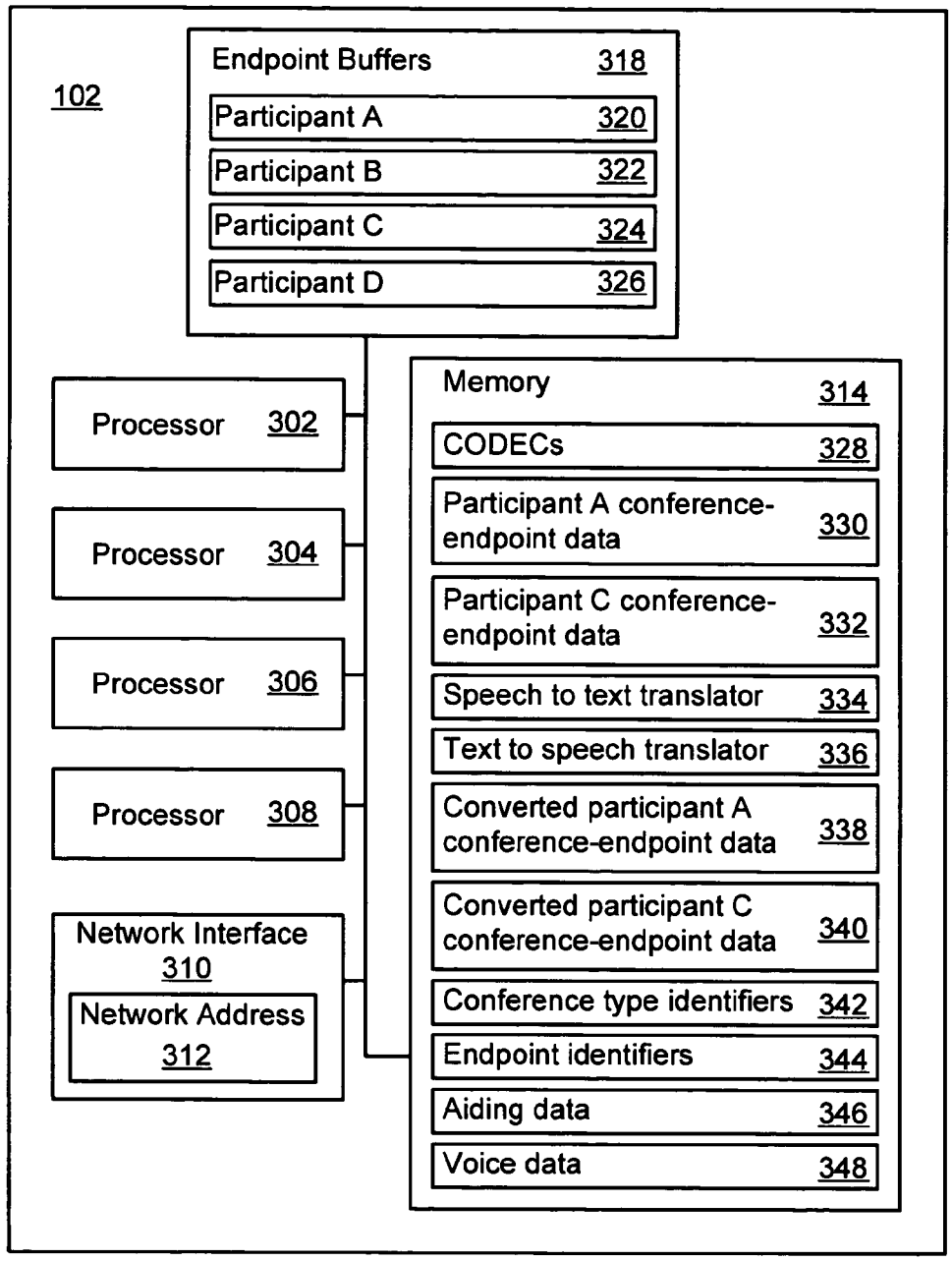
FIG. 3 illustrates one implementation of a mixed mode conferencing system.

FIG. 3 illustrates an implementation of the conferencing system 102. The conferencing system 102 includes one or more data processors, for example, the processors 302, 304, 306, and 308, a network interface 310, and a network address 312 assigned to the network interface 310. In addition, the conferencing system 102 includes a memory 314 and an endpoint buffer 318. The endpoint buffer 318 is memory physically or logically allocated into individual buffers for each endpoint handled by the conferencing system 102. FIG. 2 shows one buffer for each of the participants A (320), B (322), C (324), and D (326).

The memory 314 may store voice Coders/Decoders (CODECs) 328 as well as endpoint data received from the endpoints, such as participant A conference-endpoint data 330 and participant C conference-endpoint data 332. In addition, the memory 314 may store data conversion programs. As examples, the data conversion programs may include a speech-to-text translator 334 and a text-to-speech translator 336.

The memory 314 also stores converted endpoint data, as examples, converted participant A conference-endpoint data 338, and converted participant C conference-endpoint data 340 that result from application of the translators. Conference type identifiers 342 and endpoint identifiers 344 are also present in the memory 314.

Speech-to-text translators and text-to-speech translators may be obtained from various sources. For example, Research-Lab of Pune India provides software engines for both speech-to-text and text-to-speech translation. As another example, Scansoft of Peabody Mass. also provides speech-to-text and text-to-speech engines.

In operation, the network interface 310 receives conference traffic from the endpoints. Voice conference traffic may include, for example, encoded digitized voice samples, transmitted in UDP packets, while text messaging traffic may included text data formatted according to a text messaging protocol. The conferencing system 102 stores incoming conference traffic from a given endpoint in an associated endpoint buffer. For voice conference traffic, in one implementation the endpoint buffers 318 store approximately 1-2 packets or 20-50 ms of voice conference traffic, and may thereby reduce the effects of network jitter. The individual buffers may be enlarged or reduced however, to accommodate more or less network jitter, or to meet other implementation specifications.

Upon receiving conference data, the conferencing system 102 may optionally filter the conference data to eliminate data according to any criteria. Thus, for example, the conferencing system 102 may further process endpoint data only from the n-loudest voice conference endpoints, or may apply another filter. Similarly, the conferencing system 102 may mix multiple voice conference endpoint data streams together as a net voice conference result transmitted to each voice conference endpoint.

For the conference traffic that will be forwarded to each endpoint, the conferencing system 102 determines the format suitable for that endpoint. In one implementation, the conferencing system 102 may retrieve the conference type identifiers 342. The conference type identifiers 324 may be a data field or other code that specifies the conference type employed by each endpoint. Accordingly, for example, the conferencing system 102 may determine that participants A and B are voice conference type participants and that participants C and D are text messaging conference type participants.

Continuing the example described above with reference to FIGS. 1 and 2, the conferencing system 102 receives the participant A conference-endpoint data 330 representing coded voice samples for the message "Sales are up." The conferencing system 102 may, if the participant A conference-endpoint data 330 is coded, apply a CODEC 328 to decode the participant A conference-endpoint data 330. The voice conference system 102 may then recode the decoded data with a CODEC appropriate for participant B, and forward the recoded data to participant B. The conferencing system 102 may apply the CODEC negotiated between each endpoint and the conferencing system 102 at the time that the endpoint joins the mixed mode conference 100.

The participants C and D expect text messages. Accordingly, for the text messaging participants C and D, the conferencing system 102 prepares the converted participant A conference-endpoint data 338. To that end, the conferencing system 102 may apply a CODEC 328 to decode the endpoint data (if the endpoint data is coded), and execute the speech-to-text translator on the decoded data. In other implementations, the conferencing system 102 may perform a speech-to-text conversion (or another type of conversion) directly on coded or uncoded endpoint data.

In some implementations, the conferencing system 102 may analyze or "endpoint" the audio data coming from the participants to determine whether voice data is present (opposed to background noise or silence, as examples) before performing speech-to-text conversion. The conferencing system 102 may also buffer the voice data in larger blocks (e.g., 250 ms blocks). The block size may be adapted for the speech-to-text engines and to reduce performance impact especially in cases where the speech-to-text engines are distributed over a network.

The speech-to-text engine may also provide the voice detection or "endpointer" process in the conference system 102 with dynamic parameters to influence the sensitivity of the voice activity detection. The dynamic parameters may improve the voice recognition as well as performance. The conferencing system 102 may also provide aiding data 346 for the speech-to-text translators 334 to enhance success rates for voice recognition.

The aiding data 346 may include a dictionary of common words, phrases, or names, for example. The dictionary may also include words, phrases or names collected from surrounding infrastructure such as Lightweight Directory Access Protocol (LDAP) directories, vocabulary lists for expert or professional fields such as medical acronyms commonly employed in hospitals. The dictionary may also store words or phrases found in the text messaging data flowing through the conferencing system 102.

The aiding data may also include an identifier of the participant originating an audio message, as well as a persistent data store for that participant. The speech-to-text translator 334 may build and store a model of the participant using the persistent data store. Using the data store, the speech-to-text translator 334 may also learn about the vocabulary or acoustic properties of the participant to enhance future speech-to-text translations.

In other implementations, the aiding data 346 may alternatively or additionally include training data captured by the speech-to-text translators 334 or captured by a speech-to-text translator used in another context. The training data may originate, for example, with speech-to-text software that leads a speaker through one or more voice training exercises to enhance the accuracy of speech-to-text translation. For example, the training data may originate with a commercial speech-to-text program such as the ViaVoice™ speech recognition software used for dictation.

The aiding data 346 may assist the speech-to-text translators 334 with identifying a particular speaker. Alternatively or additionally, the conferencing system 102 may execute a separate logical instance of a speech-to-text translator 334 for one or more participants. The separate instance may then process the audio data for the given participant and build a temporary or persistent data store as more is learned about the participant.

Once prepared, the conferencing system 102 may forward the converted participant A conference-endpoint data 338 to the text messaging participants C and D. As noted above, the conferencing system 102 may apply any appropriate text messaging protocol to the converted data communicated to the text messaging conference participants. Accordingly, each text messaging participant C and D receives a text message containing the text message "Sales are up."

The conferencing system 102 also receives participant C conference-endpoint data 332 representing the reply text message from the participant C: "How much?" Because the participant D is also a text messaging conference participant, the conferencing system 102 may forward the text message to the participant D according to the protocol applicable to participant D.

The conferencing system 102 determines that the participants A and B are voice conferencing participants. Accordingly, the conferencing system 102 executes the text-to-speech translator 336 on the endpoint data 332 to prepare the converted participant C conference-endpoint data 340.

Optionally, the conferencing system 102 may select conversion parameters such as a male/female voice model, voice pitch or tone, or other parameters selected, assigned, or determined for each endpoint. For example, when joining the mixed mode conference, the text messaging participants C and D may optionally specify a gender or explicitly chose or select other conversion parameters to distinguish their voice from others. Alternatively, the conferencing system 102 may select conversion parameters based on one or more endpoint identifiers 342. For example, the conferencing system 102 may respond to an endpoint identifier representing a male speaker by specifying a male voice model as a conversion parameter to the translator 336.

Alternatively, the conferencing system 102 may select from one of the voice data 348 that may also be present in the memory 314. The voice data 348 may represent one or more individual voices that the conferencing system 102 may assign to a participant. For example, the voice data may be one or more voices provided by the text-to-speech translators 336, may be vocal tract models for generating a voice, or may be another voice model. As one example, the Speechify™ software from Scansoft provides the Tom, Jill, Mara, Karen, Helen, Felix, and other voices that may "speak" any given text. The conferencing system 102 may assign a voice to a participant based on gender, dialect, language, or another criteria.

The text-to-speech translator 336 may also include a dictionary as noted above. The dictionary may store common words, phrases, and names. The dictionary may also store words and pronunciation guides for words employed by specific professions or experts, including acronyms or abbreviations employed in medicine, law, engineering, or other professional disciplines.

After conversion, the conferencing system 102 may then individually apply a CODEC selected for each voice conferencing participant A and B. Once coded, the conferencing system 102 may then forward the coded converted endpoint data to the participants A and B. Alternatively, if A and B have requested the same CODEC and the output would be the same or nearly the same for A and B, the conferencing system 102 may choose to apply the CODEC and send the same output to A and B. Consequently, the participants A and B receive coded audio data that produces the audible message "How much?"

Regardless of what data the conferencing system 102 forwards to what endpoint, the conferencing system may also include an endpoint identifier with the data. The endpoint identifiers 344 may be a text label such as a name that identifies the source of a message submitted to the mixed mode conference. As noted above, the endpoint identifier may take other forms, however, including special symbols, data fields, or other indicia assigned to a participant.

Figure 4:
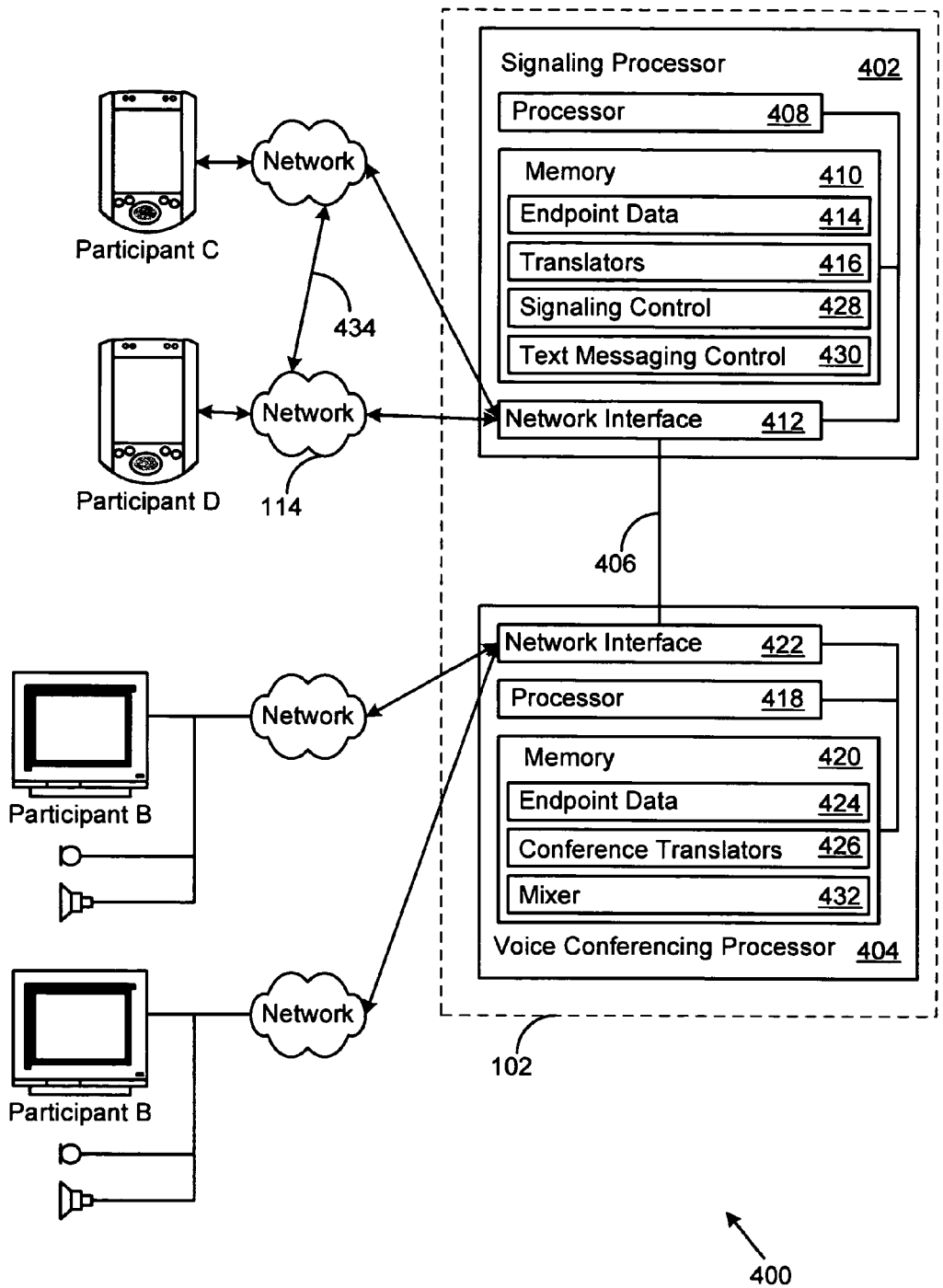
FIG. 4 illustrates one implementation of a mixed mode conferencing system.

FIG. 4 shows another example of an implementation 400 of the conferencing system 102. In the implementation 400, the conferencing system 102 is distributed between multiple processing systems. For example, the conferencing system 102 may include the signaling and control processor 402 in communication with a voice conference processor 404 over the network connection 406.

The signaling and control processor 402 may establish call or text messaging sessions through an appropriate protocol. For example, the protocol may be the SIP or H.323 protocol. The signaling and control processor 402 may also enforce policies that govern which participant may join which conference, or other policies. The signaling and control processor 402 may control the signaling to participants directly, or the signaling and control processor 402 may connect the participants through infrastructure for the appropriate protocol, for example, through a SIP proxy.

A centralized approach to text messaging may be used in which the conferencing system 102 implements a central text messaging "mixer" that may be used by multiple participants (e.g., participants C, D, and others) to talk to each other through the conferencing system 102. In the centralized approach, the participants C, D, and others may be connected through the conferencing system 102 in a star topology. However, the conferencing techniques discussed may also apply to distributed approaches to text message conferences, such as that taken by Microsoft Multi-Party IM. In the distributed case, the conferencing system 102 may be part of the ring or meshed connection 434 between text messaging participants (such as participants C and D) and may proxy the participants that are present via a different media (such as participants A and B). In certain instances, the conference system 102 may then connect for each proxied participant (e.g., the participants A and B) to the distributed text conference.

The network connection 406 may be implemented as noted above with regard to the network 114. Alternatively or additionally, the network connection 406 may employ other protocols. For example, the network connection 406 may operate under the MEGACO/H.248 general purpose gateway control protocol.

The signaling and control processor 402 may include a processor 408, memory 410, and a network interface 412. The memory 410 may store translated and untranslated endpoint data 414 received from the text messaging endpoints or from the voice conferencing processor 404. In addition, the memory 410 may optionally include one or more conference type translators 416, such as the text-to-speech or speech-to-text translators noted above. The memory 410 may also include the signaling control program 428 that performs the signaling noted above, and a text messaging control program 430, responsible for mixing text messages for deliver to the participants.

Similarly, the voice conferencing processor 404 may include a processor 418, memory 420, and a network interface 422. The memory 420 may store translated and untranslated endpoint data 424 received from the voice conferencing endpoints or from the signaling and control processor 402. In addition, the memory 410 may optionally include one or more conference translators 426 for preparing converted conference data, such as text-to-speech or speech-to-text translators note above. The memory 420 may also include a mixer 432 that mixes voice conferencing data or text messaging data for delivery to the endpoints. Either of the memories 410 and 420 may include additional data, such as CODECs, endpoint identifiers, and conference type identifiers, or may omit one or more of the data or program components described above.

The signaling and control processor 402 may coordinate, manage, and process data from text messaging participants, such as participants C and D. For example, the signaling and control processor 402 may receive and process text messages according to the protocol employed by each text messaging endpoint. For each endpoint that is also a text messaging endpoint, the signaling and control processor 402 may then transmit the text message to those endpoints, under the protocol employed by those endpoints.

When each endpoint that is not a text messaging endpoint, however, the signaling and control processor 402 may forward the text message to the voice conferencing processor 404 over the network connection 406. In response, the voice conferencing processor 404 may apply a text-to-speech translator to the text data. In addition, the voice conferencing processor 404 may apply a CODEC negotiated for each endpoint to the converted data, and transmit the individually coded and converted data to each voice conferencing endpoint.

Similarly, the voice conferencing processor 404 may coordinate, manage, and process data for the voice conferencing participants. In that regard, the voice conferencing processor 404 may receive and process coded or uncoded voice conference messages transmitted by each voice conferencing endpoint. For each endpoint that is also a voice conferencing endpoint, the voice conferencing processor 404 may optionally decode and recode the voice conference message with the CODEC suitable for each endpoint. The voice conference processor 404 may then transmit the recoded message to each voice conference endpoint.

For endpoints in the mixed mode conference that are not voice conference endpoints, the voice conferencing processor 404 may transmit the received voice message data to the signaling and control processor 402. After receiving the voice message data, the signaling and control processor 402 may decode the voice message data and apply a speech-to-text translator to the decoded voice message data. For each text messaging endpoint, the signaling and control processor 402 may then transmit the prepared text message to those endpoints according to the protocol employed by those endpoints.

Note that one or more of the processing steps explained above may be performed at different times by the different processors 402, 404. As one example, prior to transmitting the voice message data to the signaling and control processor 402, the voice conferencing processor 404 may first decode the voice message data. Alternatively, the voice conferencing processor 404 also may apply a translator 426 to the decoded voice message data to prepare the text data for the text messaging endpoints. In that case, the voice conferencing processor 404 may then forward the prepared text message to the signaling and control processor 402 in addition to, or instead of, the coded or uncoded voice message data. The signaling and control processor 402 may then forward the text data and optionally the voice message data to each text messaging endpoint under the protocol employed by those endpoints.

Similarly, the signaling and control processor 402 may apply a translator 416 to the text data received from the text messaging endpoints. The signaling and control processor 402 may optionally code the resulting voice message data, or may transmit the resulting voice message data to the voice conferencing processor 404. The voice conferencing processor 404 may then code the voice message data appropriately for each voice conferencing endpoint, and transmit the coded voice message data to each voice conferencing endpoint.

In other implementations, the conferencing system 102 may obtain text-to-speech or speech-to-text functions as a network service. For example, the conferencing system 102 may issue translation requests (e.g., via a remote procedure call or other mechanism) to a separate network-connected data processing system that provides translation services. In other words, the conferencing system 102 may obtain translation services from other sources.

Figure 5:
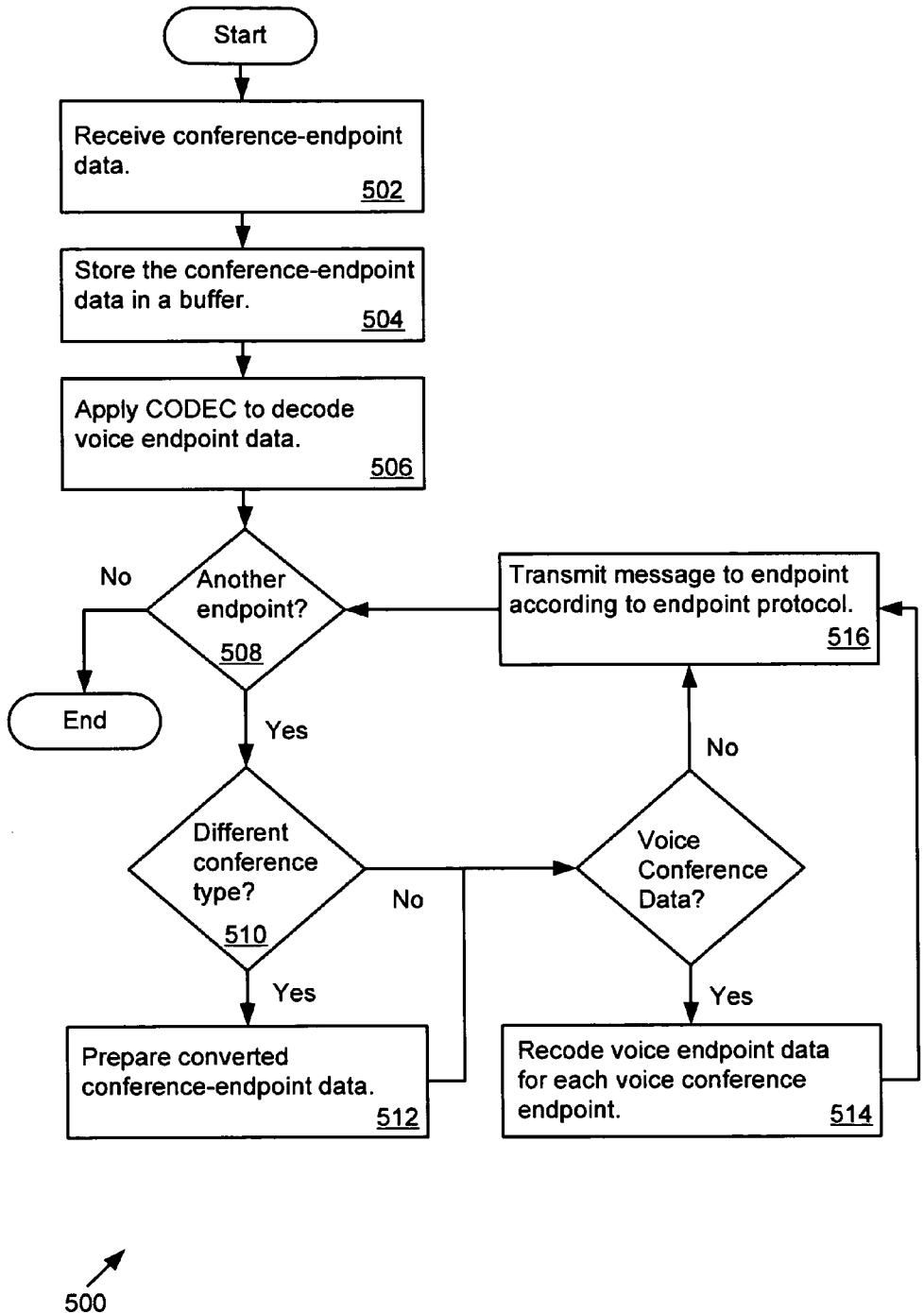
FIG. 5 illustrates one example of a flow diagram of the acts that may be taken by a mixed mode conferencing system.

FIG. 5 shows a flow diagram 500 of the acts that may be taken by the conferencing system 102. The conferencing system 102 receives incoming conference data from endpoints (Act 502). The endpoint buffers 318 temporarily store the incoming conference data (Act 504). For voice message data, the conferencing system 102 may then apply one or more CODECs 220 to decode the voice message data (Act 506).

The conferencing system 102 determines whether the received conference message remains to be forwarded to any additional endpoints (Act 508). If so, the conferencing system 102 determines the conference type for the next endpoint to which conferencing system 102 will send the message. The conferencing system 102 may thereby determine if the conference type for the next endpoint is different than the conference type for the endpoint that submitted the message (Act 510).

If the conference type is different, then the conferencing system 102 prepares converted conference-endpoint data (Act 512). As examples, the conferencing system 102 may convert text data to voice data or may convert voice data to text data. If the conference type is not different, then the conferencing system 102 need not convert the received endpoint data. Instead, when the destination endpoint is a voice conferencing endpoint, the conferencing system 102 may decode the voice conference data and recode the data with a coder negotiated at conference setup for each endpoint (Act 514).

In either case, the conferencing system 102 transmits the received message, optionally converted or recoded, to the destination endpoint (Act 516). In doing so, the conferencing system 102 may transmit the message in accordance with any established messaging protocol such as SIP or SIMPLE. Accordingly, each conference endpoint, regardless of conference type, may receive and transmit messages to the mixed mode conference 100.

The conferencing system 102 integrates multiple conference types into a mixed mode conference. As a result, the individuals that participate in the conference need not adhere to a common conference type. Consequently, as examples, individuals that are hearing impaired may instead interact with the conference through text messaging, while individuals driving or otherwise occupied may participate through voice conferencing. The conferencing system 102 may thereby enhance communication possibilities to support business, personal, and other endeavors.

It is intended that the foregoing detailed description be regarded as illustrative rather than limiting, and that it be understood that it is the following claims, including all equivalents, that are intended to define the spirit and scope of this invention.

What is claimed is:

1. A conferencing method comprising:
   receiving first endpoint data for a first conference type from a first endpoint;
   determining whether at least one second endpoint is participating in a conference with the first endpoint;
   determining a second conference type for transmitting the received first endpoint data to the at least one second endpoint, the determining the second conference type comprising reading a second conference type identifier from a memory, the second conference type identifier specifying the second conference type for the at least one second endpoint participating in the conference with the first endpoint;
   determining whether the second conference type is different than the first conference type;
   selecting a conversion program based on whether the second conference type is different than the first conference type, the conversion program converting the received first endpoint data to second endpoint data that is compatible with the second conference type;
   reading a first endpoint identifier for the first endpoint;
   transmitting the converted received first endpoint data to the at least one second endpoint, the transmitted data comprising the first endpoint identifier for the first endpoint;
   receiving second endpoint data from the at least one second endpoint;
   the conversion program converting the received second endpoint data to first endpoint data that is compatible with the first conference type;
   reading a second endpoint identifier for the at least one second endpoint; and
   transmitting the converted received second endpoint data to the first endpoint, the transmitted second endpoint data comprising the second endpoint identifier for the at least one second endpoint; and
   wherein the conversion program converting the received second endpoint data to the first endpoint data that is compatible with the first conference type comprises the conversion program utilizing a conversion parameter if the first conference type is a voice conference and the second conference type is a text messaging conference; and
   wherein the conversion parameter comprises predetermined voice attributes based on the second endpoint identifier of the at least one second endpoint that are independent of a voice of a user of the at least one second endpoint; and
   wherein the conversion program converting the received first endpoint data to the second endpoint data that is compatible with the second conference type comprises the conversion program utilizing aiding data if the second conference type is a text messaging conference and the first conference type is a voice conference; and
   wherein the aiding data comprises a model of stored voice data for a user of the first endpoint.

2. The method of claim 1 wherein the at least one second endpoint comprises a plurality of second endpoints and wherein transmitting the converted received second endpoint data to the first endpoint comprises mixing the converted received second endpoint data from each of the plurality of second endpoints into a single transmission and transmitting the single transmission to the first endpoint.

3. The method of claim 1 wherein the conversion program converting the received second endpoint data to the first endpoint data that is compatible with the first conference type comprises the conversion program executing a text to speech translator.

4. The method of claim 1 wherein the conversion program converting the received first endpoint data to the second endpoint data that is compatible with the second conference type comprises the conversion program executing a speech to text translator.

5. The method of claim 1 wherein the conversion parameter further comprises a voice, wherein the voice is based on a selected gender, selected dialect, or selected language.

6. The method of claim 1 wherein the aiding data further comprises training data captured during a training exercise of the speech to text translator.

7. The method of claim 1 wherein the transmitting the converted received first endpoint data to the at least one second endpoint and the transmitting the converted received second endpoint data to the first endpoint comprise transmitting using at least one of Session Initiation Protocol (SIP), SIP for Instant Messaging and Presence Leveraging Extensions (SIMPLE), or Jabber protocol.

8. The method of claim 3 wherein the text to speech translator comprises a dictionary of common words, phrases, and names.

9. The method of claim 6 wherein the aiding data further comprises a dictionary of common words, phrases, and names.

10. A conferencing system comprising:
    a non-transitory computer readable memory device comprising:
    first endpoint data for a first conference type received from a first endpoint;
    second endpoint data for a second conference type received from at least one second endpoint;
    a first endpoint identifier for the first endpoint;

a second endpoint identifier for the at least one second endpoint;

a second conference type identifier specifying the second conference type for the at least one second endpoint; and a conversion program;

a processor;

wherein the processor determines whether the at least one second endpoint is participating in a conference with the first endpoint; and wherein the processor determines the second conference type for transmitting the received first endpoint data to the at least one second endpoint; and wherein the processor determines the second conference type by reading the second conference type identifier from the memory; and wherein the processor determines whether the second conference type is different than the first conference type; and wherein the processor selects the conversion program based on whether the second conference type is different than the first conference type; and wherein the conversion program converts the received first endpoint data to second endpoint data that is compatible with the second conference type; and wherein the processor reads the first endpoint identifier for the first endpoint; and wherein the processor transmits the converted received first endpoint data to the at least one second endpoint, the transmitted data comprising the first endpoint identifier for the first endpoint; and wherein the conversion program converts the received second endpoint data to first endpoint data that is compatible with the first conference type; and wherein the processor reads the second endpoint identifier for the at least one second endpoint; and wherein the processor transmits the converted received second endpoint data to the first endpoint, the transmitted first endpoint data comprising the second endpoint identifier for the at least one second endpoint; and wherein the conversion program utilizes a conversion parameter if the first conference type is a voice conference and the second conference type is a text messaging conference, wherein the conversion parameter comprises predetermined voice attributes based on the second endpoint identifier of the at least one second endpoint that are independent of a voice of a user of the at least one second endpoint; and wherein the conversion program utilizes aiding data if the second conference type is a text messaging conference and the first conference type is a voice conference, wherein the aiding data comprises a model of stored voice data for a user of the first endpoint.

11. The conferencing system of claim 10 wherein the at least one second endpoint comprises a plurality of second endpoints and wherein the processor mixes the converted received second endpoint data from each of the plurality of second endpoints into a single transmission and transmits the single transmission to the first endpoint.

12. The conferencing system of claim 10 wherein the conversion program executes a text to speech translator to convert the received second endpoint data to the first endpoint data that is compatible with the first conference type.

13. The conferencing system of claim 10 wherein the conversion program executes a speech to text translator to convert the received first endpoint data to the second endpoint data that is compatible with the second conference type.

14. The conferencing system of claim 10 wherein the conversion parameter further comprises a voice, wherein the voice is based on a selected gender, selected dialect, or selected language.

15. The conferencing system of claim 10 wherein the at least one second endpoint comprises a plurality of second endpoints and wherein the processor filters the received second endpoint data from each of the plurality of second endpoints to eliminate the received second endpoint data from at least one of the plurality of second endpoints.

16. The conferencing system of claim 10 wherein the aiding data further comprises training data captured during a training exercise of the speech to text translator.

17. The conferencing system of claim 10 wherein the processor transmits the converted received first endpoint data to the at least one second endpoint using at least one of Session Initiation Protocol (SIP), SIP for Instant Messaging and Presence Leveraging Extensions (SIMPLE), or Jabber protocol and wherein the processor transmits the converted received second endpoint data to the first endpoint using at least one of Session Initiation Protocol (SIP), SIP for Instant Messaging and Presence Leveraging Extensions (SIMPLE), or Jabber protocol.

18. The conferencing system of claim 12 wherein the text to speech translator comprises a dictionary of common words, phrases, and names.

19. The conferencing system of claim 16 wherein the aiding data further comprises a dictionary of common words, phrases, and names.

20. A conferencing method comprising:

receiving coded first endpoint data for a first conference type from a first endpoint;

determining a second conference type for transmitting the received coded first endpoint data to at least one second endpoint that is participating in a conference with the first endpoint, the determining the second conference type comprising reading a second conference type identifier from a memory, the second conference type identifier specifying the second conference type for the at least one second endpoint;

determining whether the second conference type is different than the first conference type;

decoding the received coded first endpoint data by applying a coder-decoder (CODEC) that is selected based on the at least one endpoint, the CODEC being selected when the at least one second endpoint joins the conference with the first endpoint;

selecting a conversion program based on whether the second conference type is different than the first conference type, the conversion program converting the decoded first endpoint data to second endpoint data that is compatible with the second conference type;

reading a first endpoint identifier for the first endpoint;

transmitting the converted decoded first endpoint data to the at least one second endpoint, the transmitted data comprising the first endpoint identifier for the first endpoint;

receiving second endpoint data from the at least one second endpoint;

the conversion program converting the received second endpoint data to first endpoint data that is compatible with the first conference type;

reading a second endpoint identifier for the at least one second endpoint; and transmitting the converted received second endpoint data to the first endpoint, the transmitted second endpoint data comprising the second endpoint identifier for the at least one second endpoint; and wherein the conversion program converting the received second endpoint data to the first endpoint data that is compatible with the first conference type comprises the conversion program utilizing a conversion parameter if the first conference type is a voice conference and the second conference type is a text messaging conference; and wherein the conversion parameter comprises predetermined voice attributes based on the second endpoint identifier of the at least one second endpoint that are independent of a voice of a user of the at least one second endpoint; and wherein the conversion program converting the received first endpoint data to the second endpoint data that is compatible with the second conference type comprises the conversion program utilizing aiding data if the second conference type is a text messaging conference and the first conference type is a voice conference; and wherein the aiding data comprises a model of stored voice data for a user of the first endpoint.

21. The method of claim 20 wherein the at least one second endpoint comprises a plurality of second endpoints and wherein transmitting the converted received second endpoint data to the first endpoint comprises mixing the converted received second endpoint data from each of the plurality of second endpoints into a single transmission and transmitting the single transmission to the first endpoint.

22. The method of claim 20 wherein the conversion program converting the received second endpoint data to the first endpoint data that is compatible with the first conference type comprises the conversion program executing a text to speech translator.

23. The method of claim 20 wherein the conversion program converting the received first endpoint data to the second endpoint data that is compatible with the second conference type comprises the conversion program executing a speech to text translator.

24. The method of claim 20 wherein the conversion parameter further comprises a voice, wherein the voice is based on a selected gender, selected dialect, or selected language.

25. The method of claim 20 wherein the aiding data further comprises training data captured during a training exercise of the speech to text translator.

26. The method of claim 20 wherein the transmitting the converted decoded first endpoint data to the at least one second endpoint and the transmitting the converted received second endpoint data to the first endpoint comprise transmitting using at least one of Session Initiation Protocol (SIP), SIP for Instant Messaging and Presence Leveraging Extensions (SIMPLE), or Jabber protocol.

27. The method of claim 22 wherein the text to speech translator comprises a dictionary of common words, phrases, and names.

28. The method of claim 25 wherein the aiding data further comprises a dictionary of common words, phrases, and names.

* * * * *